United States Patent [19]

Gilbert et al.

[11] 4,115,998

[45] Sep. 26, 1978

[54] COMBUSTION MONITOR

[75] Inventors: Kendall E. Gilbert, Schenectady; Daniel Johnson, Rexford; Robert Raymond Macier, Saratoga Springs, all of N.Y.

[73] Assignee: General Electric Company, Schenectady, N.Y.

[21] Appl. No.: 754,271

[22] Filed: Dec. 27, 1976

Related U.S. Application Data

[63] Continuation-in-part of Ser. No. 638,855, Dec. 8, 1975, abandoned.

[51] Int. Cl.² ............................................. F02C 9/08
[52] U.S. Cl. ............................ 60/39.09 R; 60/223; 73/1 F; 60/39.28 T; 364/431; 364/705
[58] Field of Search ............... 60/39.28 T, 39.28 R, 60/223; 235/151.3, 151.32, 150.2, 150.21, 152; 73/1 F, 116

[56] References Cited

U.S. PATENT DOCUMENTS

| | | | |
|---|---|---|---|
| 3,377,848 | 4/1968 | Marvin | 60/39.28 R |
| 3,691,759 | 9/1972 | Scheerer | 60/39.28 R |
| 3,719,071 | 3/1973 | Hohenberg | 73/116 |
| 3,764,785 | 10/1973 | Harner | 60/39.28 R |
| 3,789,665 | 2/1974 | Hohenberg | 60/39.28 R |

Primary Examiner—Clarence R. Gordon
Attorney, Agent, or Firm—Jerome C. Squillaro

[57] ABSTRACT

An apparatus for monitoring whether the combustion system of a gas turbine is working properly includes an annular array of temperature sensors disposed in the gas turbine to monitor the temperature of the hot gas stream at a plurality of spaced positions and a temperature sensor disposed in the gas turbine to monitor the temperature of the compressor discharge flow, a digital computer, a circuit to input signals indicative of the sensed temperatures of a selected sensor to the digital computer, and a circuit for selecting the temperature sensor to be sampled. The digital computer is programmed to sequentially sample the hot gas stream sensors and to determine the median temperature thereof, compute allowable temperture limits as a function of the median temperature and the compressor discharge temperature, and to output a shutdown or alarm signal when a predetermined number of hot gas stream temperature sensors exceed the allowable limits in a predetermined pattern.

10 Claims, 5 Drawing Figures

COMBUSTION MONITOR

This is a continuation-in-part of application Ser. No. 638,855, filed Dec. 8, 1975 now abandoned.

This invention relates to gas turbine engines and more particularly to an apparatus for monitoring the operation of a gas turbine combustion system.

BACKGROUND OF THE INVENTION

Combustion systems for gas turbines usually employ one or more combustion liners of either annular or can type wherein fuel is burned to generate a generally annular hot gas stream for driving the turbine.

Because of the extremely hostile pressure and temperature environment of a gas turbine combustion system, relatively minor combustion system problems can propagate into serious gas turbine damage if left unattended.

A primary object of this invention, therefore, is to provide an apparatus for monitoring the combustion system of a gas turbine and for shutting down the turbine or sounding an alarm when an abnormalty is detected.

Another object of this invention is to provide an apparatus for detecting gas turbine combustion system problems at an early stage.

SUMMARY OF THE INVENTION

The above and other objects and advantages are achieved in the present invention by providing means for sensing the temperature of the hot gas stream generated by a gas turbine combustion system and means for determining whether the combustion system is functioning improperly as a function of such sensed temperatures and the compressor discharge temperature. The sensing means comprise a plurality of sensors, such as thermocouples, disposed in a spaced annular array in the hot gas stream flow path, such as in the exhaust duct. Means are provided for determining the median hot gas stream temperature sensed and for determining temperature limits as a function of the median temperature and the compressor discharge temperature and for generating alarm and gas turbine shutdown signals when a predetermined number of temperature sensor readings exceed such limits in a predetermined pattern.

The invention preferably employs a digital computer, input circuit means for input to the computer of the sensed temperature signals, and temperature sensor select circuit means, with the computer being programmed to cause the circuit select means to sequentially sample each hot gas stream temperature sensor and determine the median hot gas stream temperature, compute the allowable temperature limits and generate a signal when a predetermined number of hot gas stream temperature sensor readings exceed the temperature limits in a predetermined pattern.

BRIEF DESCRIPTION OF THE DRAWINGS

While the specification concludes with claims particularly pointing out and distinctly claiming the subject matter of this invention, it is believed that the invention will be better understood upon reading the following description of the preferred embodiment in conjunction with the accompanying drawings, wherein:

DESCRIPTION OF THE INVENTION

Figure 1:
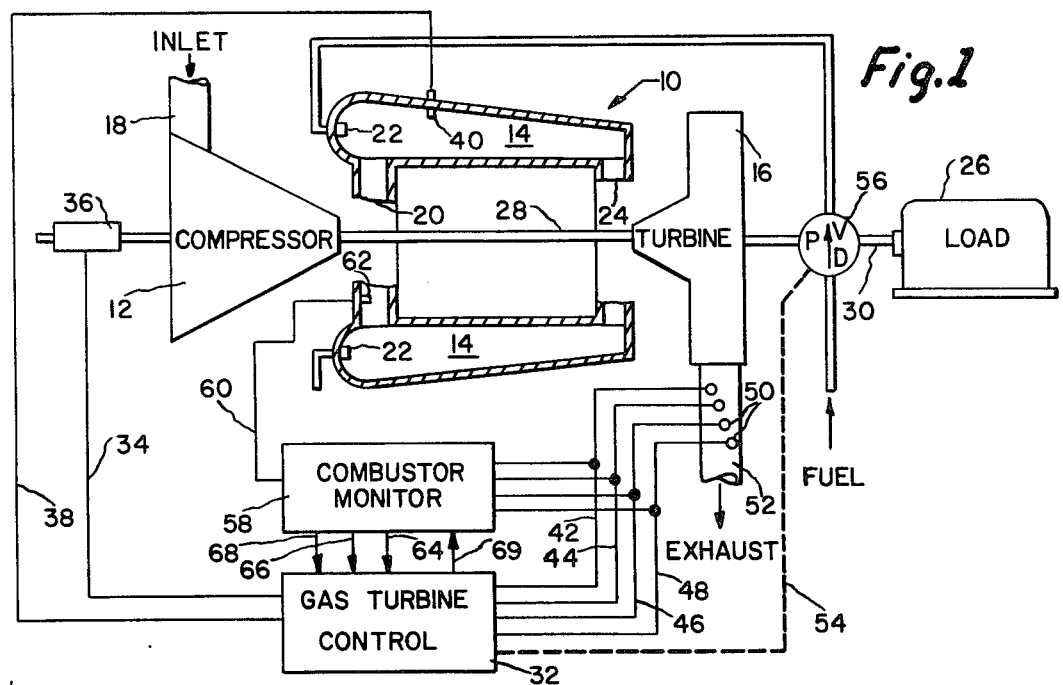
FIG. 1 is a diagrammatic representation of a gas turbine system employing the combustor monitor of this invention.

Referring now to the drawings and particularly to FIG. 1, an exemplary heavy duty gas turbine has been shown generally at 10 as including a compressor 12, a combustor 14, and a turbine 16. Air is delivered to the compressor 12 through a suitable inlet 18 and is compressed and delivered to a combustor 14 through suitable ducting, shown diagrammatically at 20. Fuel is delivered to the combustor 14 through a plurality of suitable fuel nozzles 22 and is burned in the combustor to generate a motive or hot gas stream for driving the turbine 16.

The hot gas stream generated by the combustor 14 is delivered to the turbine 16 through suitable ducting, as diagrammatically shown at 24. The turbine 16 is drivingly connected to the compressor 12 and a load 26, such as a generator, by shaft connections 28 and 30.

A suitable gas turbine control means for controlling the fuel flow to the gas turbine 10 has been shown generally at 32 as being responsive to a speed signal on line 34 which is generated by a suitable speed sensor 36, a flame detector signal on line 38 which is generated by a suitable flame detector 40, and an exhaust gas temperature signal or signals on lines 42, 44, 46, and 48, which are generated by suitable temperature sensors 50 disposed in an annular array in the exhaust duct 52 of the gas turbine. As diagrammatically indicated by line 54, the gas turbine control 32 regulates fuel flow to the nozzles 22 by way of a suitable variable delivery fuel pump or gas valve 56.

For a more detailed description of the gas turbine control 32, reference is made to U.S. Pat. No. 3,520,133, issued July 14, 1970, and assigned to the assignee of the present invention. It should be understood, however, that other gas turbine controls could be used with the present invention and that the present invention is not limited to use with the exemplary gas turbine control referenced above. Likewise, while the gas turbine 10 has been shown and described as being of the single rotor type, the combustor monitor apparatus of this invention may be beneficially employed on gas turbines which employ more than one rotor.

With continued reference to FIG. 1, the combustion monitor has been shown generally at 58 as receiving a temperature signal on lines 60, 42, 44, 46 and 48. The signal on line 60 is generated by a suitable sensor 62 which monitors the temperature of the compressed air leaving compressor 12 (compressor discharge temperature). The signals on lines 42, 44, 46 and 48 are indicative of the exhaust gas temperature. As will be hereinafter explained more fully, the combustion monitor means of this invention operates on these input signals to determine whether the combustion system (including fuel nozzles 22, combustor 14 and ducting 24) is operating properly. In the event of a detected malfunction, the combustion monitor sends an appropriate shutdown signal on line 64 or alarm signal on line 66 or 68 to the engine control 32.

While only four exhaust gas temperature sensors 50 have been depicted in FIG. 1, it should be understood that such a showing is simplified and that in actual practice as many as twelve or more generally equally spaced temperature sensors would be used in an annular array. The spacing between adjacent sensors is preferably equal and selected such that a hot or cold streak in the hot gas stream which is produced by a malfunction in the combustion system would affect more than one temperature sensor.

While the sensors 50 have been shown as being located at different axial positions relative to the hot gas stream flow, it should be understood that in practice all the sensors 50 would be positioned at approximately the same axial location or, stated another way, generally equidistant from the turbine 16.

The means of this invention for monitoring the operation of the combustion system generally comprise means for sensing the temperature of the hot gas stream, such as temperature sensors 50 disposed in exhaust duct 52, and means, such as the combustor monitor 58, for determining whether the gas turbine combustion system is operating abnormally as a function of the sensed temperatures and for generating a signal operative to cause gas turbine control means 32 to shut off fuel flow to the combustor 14 when abnormal operation is detected.

Figure 2:
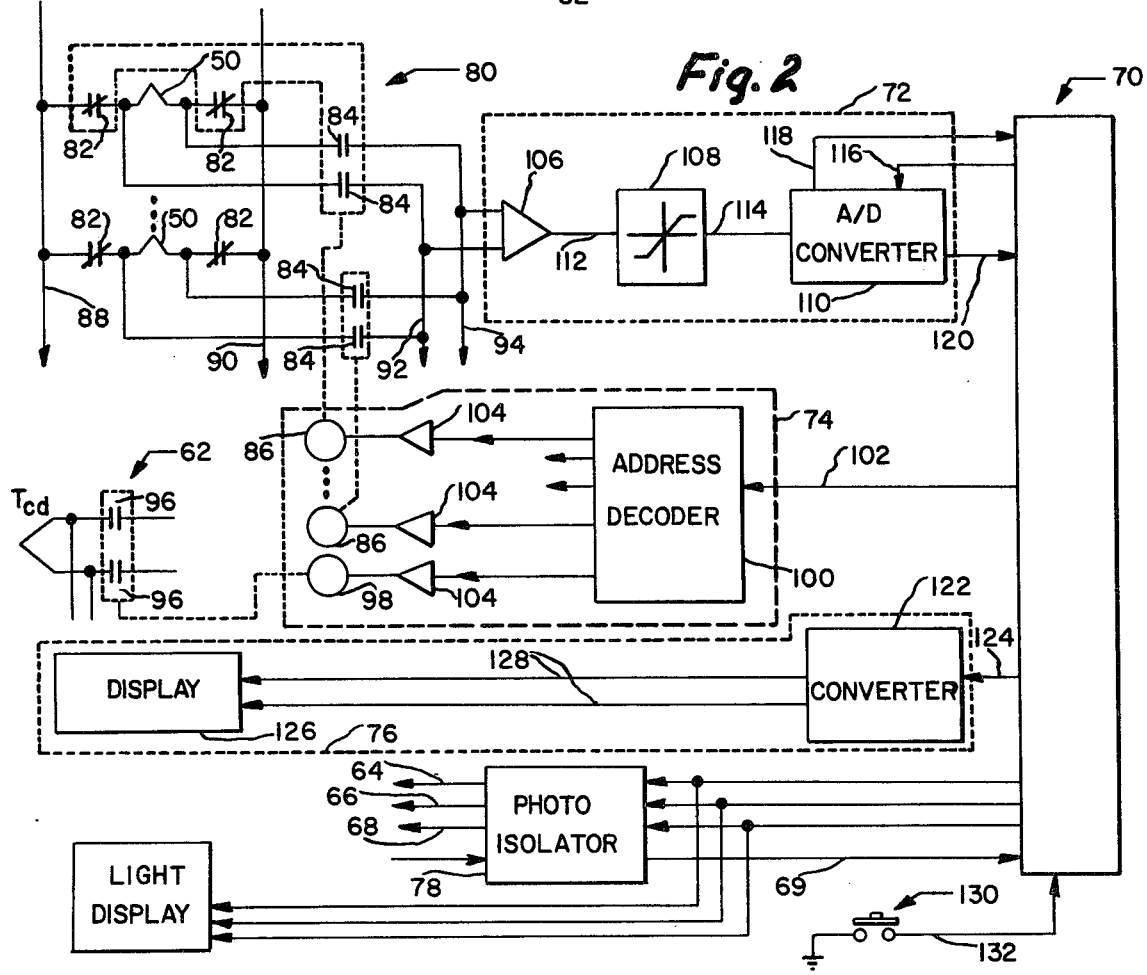
FIG. 2 is a schematic, in block diagram form, showing one form of the combustor monitor of this invention.

With reference now to FIG. 2, the combustion monitor 58 has been shown, in one form, as comprising a digital computer 70, a temperture sensor input circuit 72, a temperature sensor select circuit 74 and a display circuit 76. The alarm and shutdown signal lines 64, 66 and 68 preferably include a suitable photo isolator 78 to protect the gas turbine control from any spurious signals from the digital computer 70.

While two exhaust gas temperature sensors 50 have been schematically shown at 80, it should be understood that up to twelve or more sensors would be used in actual practice. Each sensor 50 is connected to the gas turbine control 32 and the temperature sensor input circuit 72 through suitable switching means, such as normally closed contacts 82 and normally open contacts 84 of a relay 86, and through lines 88, 90, 92 and 94.

The compressor discharge temperature sensor 62 is also connected to the input circuit 72 through lines 92, 94 and through switch means, such as normally open contacts 96 of a relay 98.

The temperature sensor select circuit 74 includes address decoder means 100 for receiving a 4-bit binary signal on line 102 from digital computer 70 and for selectively energizing one of relays 86, 98 in response to such signal through a suitable driver or amplifier 104. The decoder means 100 may be a 1 of 16 decoder.

The temperature sensor input circuit 72 has been shown as including a signal amplifier 106 for receiving and amplifying the temperature signal on lines 92, 94, limiter means 108 and an analog to digital converter means 110. The limiter means 108 is adapted to receive the signal output from amplifier 106 on line 112 and limit the input signal to the converter means 110 on line 114, and may comprise a diode limiter and an amplifier with a gain of 1. The converter means 110 is adapted to convert the temperature signal received on line 114 into a suitable 8-bit binary signal for processing by computer 70 in response to a "start computation" signal received from computer 70 on line 116. The converter means 110 is also adapted to provide a signal to the computer 70 through line 118 to indicate when a particular analog to digital conversion has been made. The digital temperature signal generated by converter means 110 is delivered to the computer 70 through a suitable 8-bit binary line 120.

The display circuit 76 includes a binary to binary coded decimal converter means 122 for receiving an 8-bit binary temperature spread signal from digital computer 70 on line 124 and for converting this signal to a 10-bit binary coded decimal signal. This binary coded decimal signal is then delivered to a suitable digital display 126 through lines 128.

A photo isolator 78 may be provided between the combustion monitor and the gas turbine control 32 for lines 64, 66 and 68 and for line 69. Line 69 functions to deliver an enable signal from gas turbine control 32 which is effective to turn on the computer 70.

A suitable reset switch is provided at 130 to selectively ground line 132 and thereby reset the computer 70 or reset or index the program for computer 70 to its "0" position.

Figure 3:
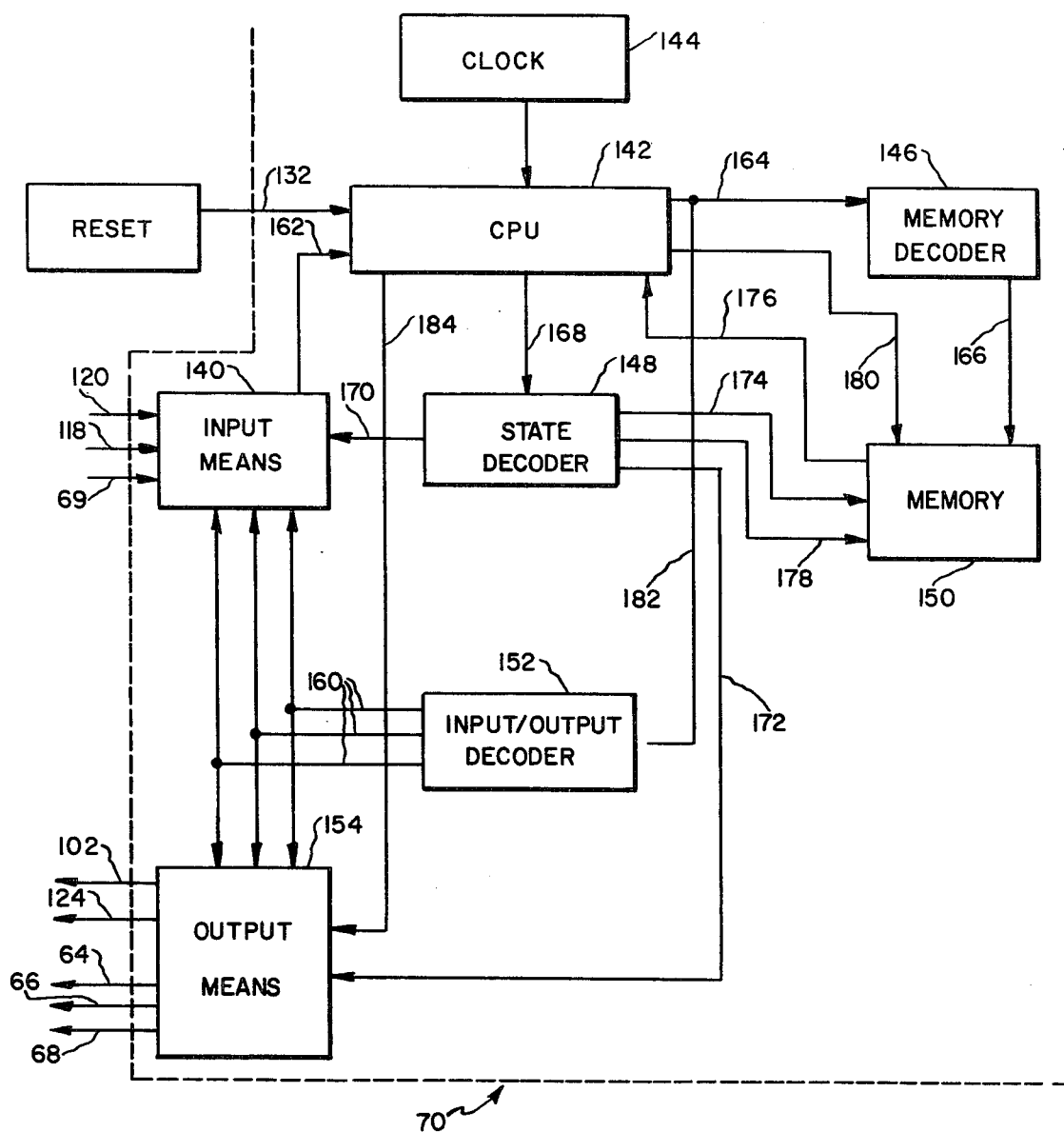
FIG. 3 is a block diagram schematically showing one form of the digital computer of FIG. 2.

With reference now to FIG. 3, the digital computer 70 has been shown in block diagram form as including input means 140, a central processing unit 142 (hereinafter referred to as "CPU"), a clock 144 for the CPU, a memory decoder 146, a state decoder 148, a memory 150, an input/output decoder 152 and output means 154.

The input means 140 is adapted to selectively receive an input signal from one of lines 69, 118, 120 in response to a command signal received on one of lines 160 and deliver this signal to the CPU 142 for further processing on line 162.

As will be understood, the clock means 144 functions to time the sequential operations of the CPU 142 so as to ensure that a new operation is not started until the prior operation has been completed.

When information is to be stored or read out of memory 150, a memory address signal is generated by the CPU 142 and delivered to the memory decoder 146 on line 164. Based on the memory address signal, the memory decoder 146 provides a memory select signal to memory 150 on line 166.

The state decoder means 148, in response to a signal on line 168 from CPU 142, functions to selectively energize the input and output means 140 and 154 by way of lines 170 and 172, respectively, and tells the memory 150 whether it should function in a memory read or memory write mode. When the memory read mode is energized by line 174, the information stored at the location selected by memory decoder 146 is delivered to the CPU 142 on line 176. Likewise, when the memory write mode is energized by line 178, information is delivered on line 180 by the CPU 142 and stored at the memory address selected by memory decoder 146.

The input/output decoder means 152, in response to a signal on line 182 from the CPU 142, delivers a select signal on one of lines 160 to the input means 140 and the output multiplex means 154 which tells these means which of lines 64, 66, 68, 69, 102, 118, 120 or 124 should be sampled. For example, when line 102 of the temperature sensor select circuit 74 of FIG. 2 is selected, the coded binary signal indicative of which temperature sensor 50 is to be sampled is delivered on line 184 from the CPU and, hence, through output means 154 and line 102.

In operation, the twelve temperature sensors 50 and the compressor discharge temperature sensor 62 are sequentially sampled on a continuous basis. Their respective temperature readings are amplified, converted to an 8-bit offset binary digital signal and delivered to the CPU 142 by the temperature sensor input circuit 72.

While each connection between the components of FIGS. 2 and 3 has been depicted and described as a single line, it will be understood that those lines that transfer digital information are preferably comprised of multiple conductors.

As will be hereinafter described in greater detail, the computer 70 first determines the median temperature sensor reading "$T_m$" based on one complete scan of each of the temperature sensors 50. Based on "$T_m$" the computer then calculates a predetermined number of temperature limits as a function of the compressor discharge temperature "$T_{cd}$" and "$T_m$" and determines whether these limits are exceeded by a predetermined number of sensors 50 in a predetermined pattern.

Figure 4:
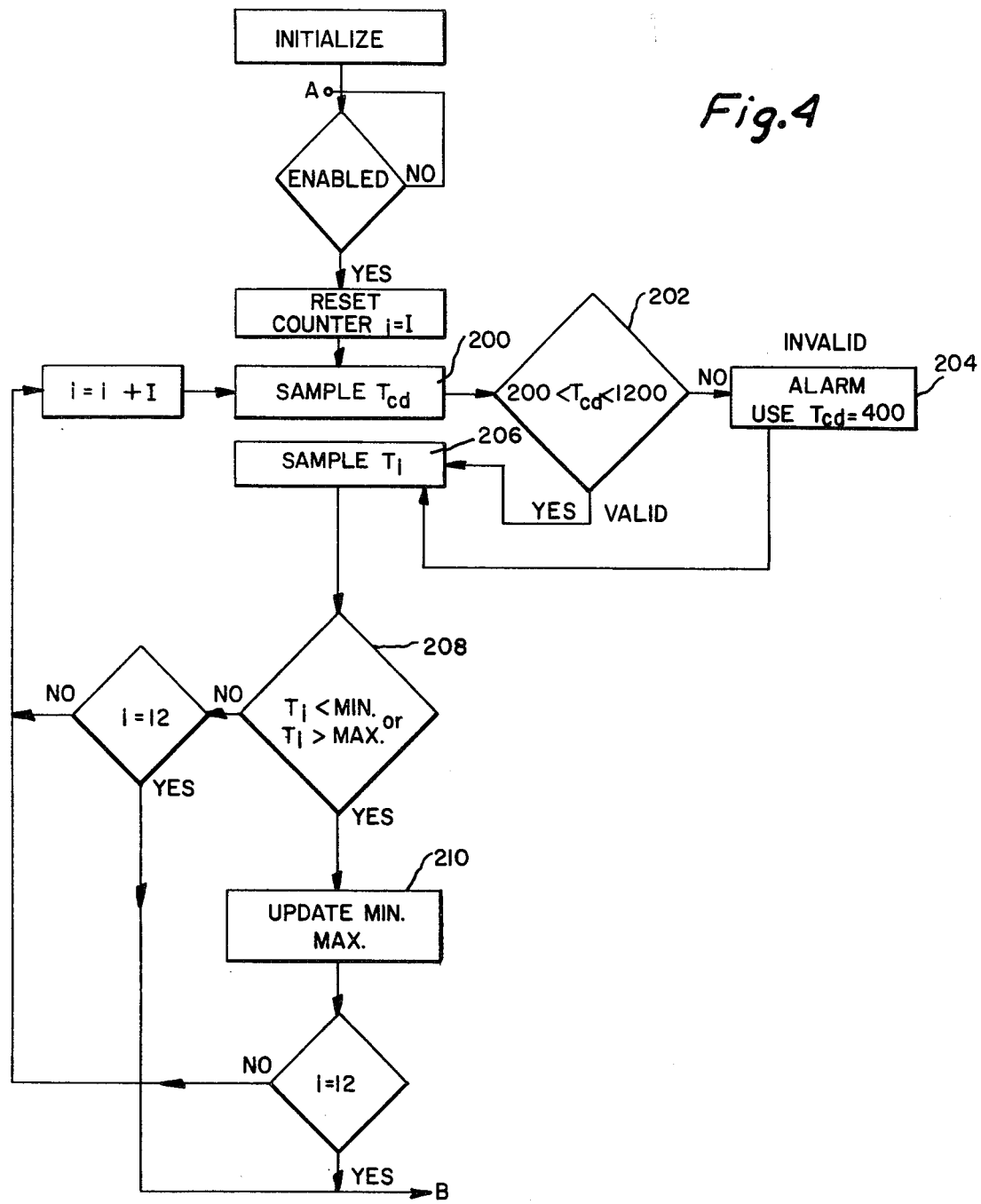
FIG. 4 is a flow graph of a program which may be used in the present invention for the digital computer of FIG. 3.
Figure 5:
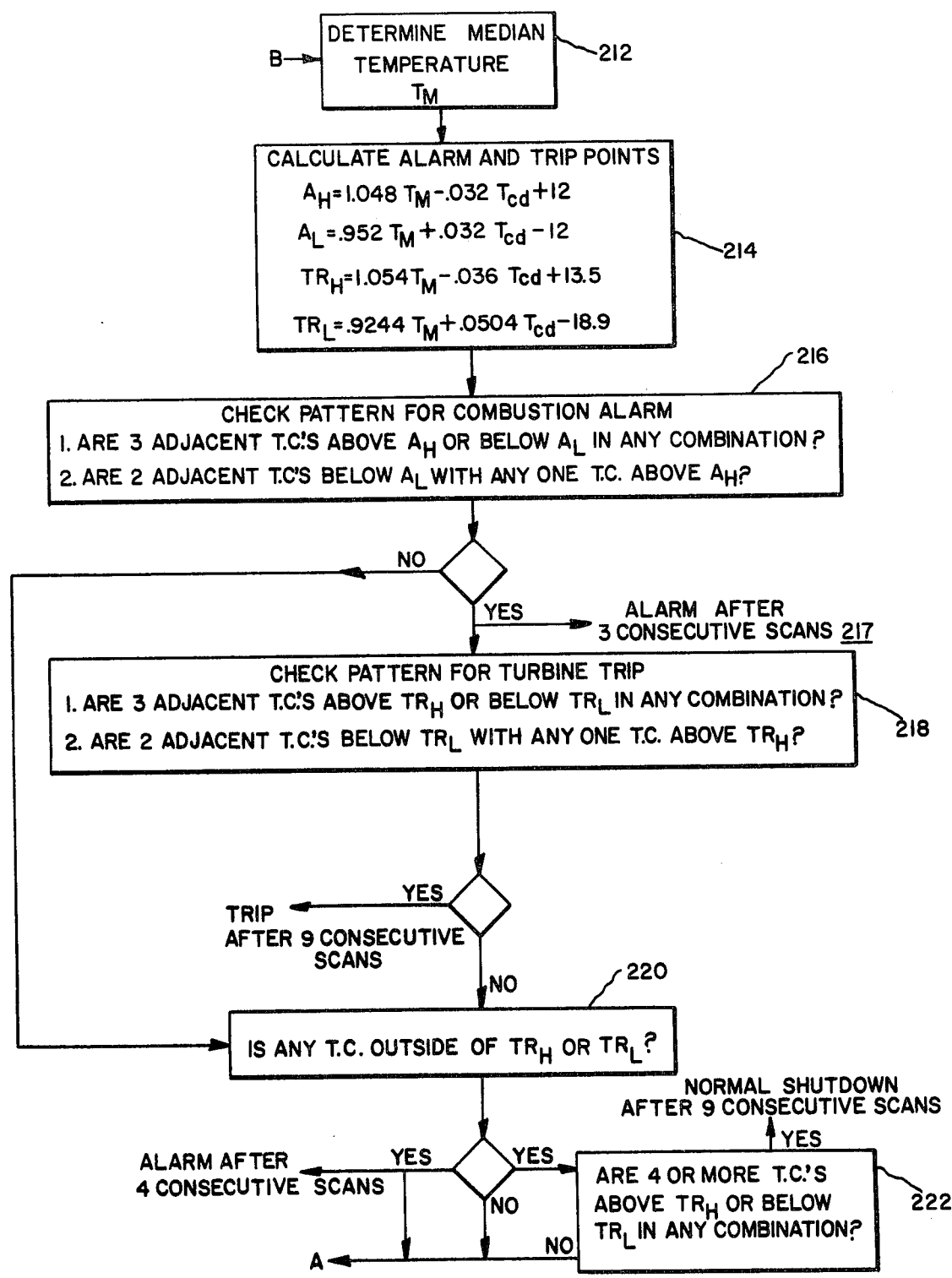
FIG. 5 is a continuation of the flow graph of FIG. 4.

Flow graphs for the digital computer 70 are shown in FIGS. 4 and 5 for a combustion monitor system employing 12 exhaust gas temperature sensors 50. In these figures, "$T_{cd}$" represents the temperature reading of the compressor discharge temperature sensor 62; "$T_i$" represents the temperature reading of one of the exhaust gas temperature sensors 50; "$T_m$" represents the median temperature as a result of a single scan of each of the temperature sensors 50; "$A_H$" represents the high alarm limit; "$A_L$" represents the low alarm limit; "$TR_H$" represents the high trip limit; and "$TR_L$" represents the low trip limit.

With continued reference to FIGS. 4 and 5, after enabling and resetting the counter at 1, the compressor discharge temperature is sampled at 200 and compared at 202 to an upper and lower limit, such as 200 and 1200. If "$T_{cd}$" is outside of these limits, it is rejected as a bad thermocouple at 204 and a preselected value, such as 400° F, is used in place of the sampled "$T_{cd}$". Next, each exhaust gas temperature sensor is sampled at 206.

At 208, each exhaust gas temperature reading is compared with the prior maximum exhaust gas temperature reading and the prior minimum exhaust gas temperature reading. If a temperature reading is higher than the previous high reading, it displaces the old maximum reading at 210. Likewise, if the temperature reading is lower than the old low reading, it displaces the old minimum reading at 210. When each of the temperature sensors 50 have been sequentially sampled, the median temperature from a single such scan is determined at 212. As will be understood, when an odd number of sensors 50 are employed, the median temperature will be the temperature sensor reading of the middle reading sensor. On the other hand, where an even number of temperature sensors 50 are employed, the median temperature will be the average of the readings taken from the two middle reading sensors. At 214, high and low alarm and trip limits ($A_H$ and $A_L$, and $TR_H$ and $TR_L$) are computed as predetermined functions of the median temperature and the compressor discharge temperature. While particular functions of "$T_m$" and "$T_{cd}$" are shown at 214, it will be recognized that the precise function used may vary from one gas turbine design to another.

With continued reference to the flow chart of FIG. 5, each temperature sensor reading from a single complete scan is compared at 216 to "$A_H$" and "$A_L$" to determine if any reading is above "$A_H$" or below "$A_L$" and, if there are any such out of bounds readings, to determine whether they exist in a predetermined pattern. In the embodiment of FIG. 5, two patterns are addressed. If any three circumferentially adjacent temperature sensors are above "$A_H$" or below "$A_L$" in any combination and if this condition exists for three consecutive scans of the sensors 50, then an alarm signal will be given at 217 to indicate a potential combustion system problem. Likewise, if any two circumferentially adjacent sensors 50 are below the "$A_L$" limit and any one sensor 50 is above "$A_H$", and if this condition exists for three consecutive scans of the sensors 50, then the alarm signal will be given at 217 to indicate a potential combustion system problem. It has been determined that the foregoing patterns fairly anticipate the temperature patterns that would be expected with most failure modes of a gas turbine combustion system, although it should be understood that these patterns may be varied, for example, with the number of temperature sensors employed and type of combustor.

While the arrangement of FIGS. 5 requires a deviation on three consecutive scans so as to prevent transient operating conditions from sounding an alarm, it should be recognized that this number may be varied.

In the event that any of the patterns of high or low sensor readings of 216 are found, the temperature sensor readings are further analyzed at 218 to determine whether the sensor readings are above "$TR_H$" or below "$TR_L$" in the same patterns described in connection with 216. If one of the patterns of high and low temperature sensor readings at 218 is found and exists for nine consecutive scans, a trip signal is generated to shut off fuel to the gas turbine.

If none of the patterns of 216 are found or if the patterns of 218 have not been found for nine consecutive scans of the sensors 50, then each sensor 50 is examined at 220 to determine whether it exceeds "$TR_H$" or is below "$TR_L$". If all sensors 50 read within "$TR_H$" and "$TR_L$" then a new scan of the temperature sensors is started at A in FIG. 4. If any four or more of the readings from a single scan of temperature sensors 50 are above "$TR_H$" or below "$TR_L$", in any combination, and such condition exists for nine consecutive scans, a normal shutdown signal is generated at 222 which is operative to cause the gas turbine to shutdown in a normal sequence.

While it has been found that the patterns of 216, 218 and 222 reasonably anticipate those temperature patterns or profiles that appear in the exhaust gas stream for most failure modes of a gas turbine combustion system, it should be understood that these patterns may be varied, for example, as a function of the number of temperature sensors and the type of combustor employed.

While the arrangement of FIG. 5 requires the patterns of 216, 218 or 222 to be found during a specified number of consecutive scans before an alarm signal or a trip or shutdown signal is generated so as to prevent transient operating conditions from triggering these signals, it should be understood that the number of required consecutive scans may be varied and may be reduced to a single scan.

While a preferred embodiment of the present invention has been depicted and described, such embodiment is intended to be exemplary only and not definitive, and it will be appreciated by those skilled in the art that many substitutions, alterations and changes may be made thereto without departing from the fundamental theme of the invention.

What is claimed is:

1. In combination, a gas turbine of the type having a compressor, a combustion system for receiving fuel and compressed air from said compressor and for generating an annular hot gas stream, a turbine adapted to be rotatably driven by said annular hot gas stream and drivingly connected to said compressor, an exhaust duct for exhausting said hot gas stream after passage through said turbine, and control means for controlling the operation of said gas turbine and for regulating fuel flow to the combustion system in response to various parameters of operation of said gas turbine and means for early detection of malfunctions in the combustion system and for causing the fuel flow to said combustion system to shut off in response to a detected malfunction, said detection means including:

- a temperature sensor disposed in temperature sensing relationship to the discharge flow of compressed air from said compressor;
- a plurality of temperature sensors disposed in a generally equally spaced annular array in temperature sensing relationship to the hot gas stream generated by said combustion system;
- monitoring means for automatically and repeatedly scanning each said temperature sensor and for determining the median temperature sensed by said hot gas stream temperature sensors during each complete scan of said temperature sensors, for determining a high and a low trip limit for each complete scan of said temperature sensors as a function of the reading of said compressor discharge temperature sensor and said median temperature, for automatically comparing each said hot gas stream temperature sensor reading to said high and said low trip limits, and for generating a signal operative to cause said control means to shut off fuel flow to said combustion system when a predetermined number of said hot gas stream temperature sensors are outside of said trip limits in a predetermined pattern.

2. The structure of claim 1 further characterized in that said predetermined pattern comprises three adjacent hot gas stream temperature sensors being outside of said trip limits.

3. The structure of claim 1 further characterized in that said predetermined pattern comprises two adjacent hot gas stream temperature sensors being below said low trip limit with any one other hot gas stream temperature sensor being above said high trip limit.

4. The structure of claim 1 further characterized in that said predetermined pattern comprises any four hot gas stream temperature sensors being outside of said trip limits.

5. The structure of claim 1 further characterized in that said signal operative to cause said control means to shut off fuel to said combustion system is generated only when said predetermined pattern exists for a predetermined number of complete scans of said hot gas stream temperature sensors.

6. The structure of claim 1 further characterized in that said monitoring means includes means for comparing said compressor discharge temperature sensor reading with a preselected upper and lower limit and for using a preselected value for the compressor discharge temperature in the determination of said high and low trip limits when the reading of said compressor discharge temperature sensor is outside of said preselected upper and lower limit.

7. The structure of claim 1 further characterized in that said monitoring means further includes means for determining a high and a low alarm limit for each complete scan of said temperature sensors as a function of the reading of said compressor discharge temperature sensors and said median temperature, for automatically comparing each said hot gas stream temperature sensor reading to said high and said low alarm limit, and for generating an alarm signal when a predetermined number of said hot gas stream temperature sensors are outside of said alarm limits in a predetermined pattern during a predetermined number of consecutive complete scans of said temperature sensors.

8. The structure of claim 1 further characterized in that said monitoring means includes a digital computer, input circuit means for sequentially receiving the signal generated by each temperature sensor and generating a binary coded signal indicative of the sensed temperature for delivery to said digital computer, temperature sensor select circuit means for connecting a selected temperature sensor to said input circuit means in response to a signal generated by said digital computer, said digital computer being programmed to cause said input and select circuit means to sequentially sample each said temperature sensor means, determine said median temperature and said high and low trip limits, compare each said hot gas stream temperature sensor reading with said high and low trip limits, and generate said fuel shutoff signal when said predetermined number of hot gas stream temperature sensors are outside of said trip limits in said predetermined pattern.

9. The structure of claim 8 further characterized in that said digital computer is programmed to generate said fuel shut-off signal when any one of three patterns are present, one said pattern being any three adjacent hot gas stream temperature sensors being outside of said trip limits, the second said pattern being any two adjacent hot gas stream temperature sensors being below said low trip limit with any other hot gas stream temperature sensor being above said high trip limit, and the third pattern being any four hot gas stream temperature sensors being outside of said trip limits.

10. The structure of claim 9 further characterized in that said digital computer is operative to generate said fuel shut-off signal only when said predetermined pattern exists for a predetermined number of complete scans of said hot gas stream temperature sensors.

* * * * *